US007974956B2

(12) United States Patent
Garg et al.

(10) Patent No.: US 7,974,956 B2
(45) Date of Patent: Jul. 5, 2011

(54) AUTHENTICATING A SITE WHILE PROTECTING AGAINST SECURITY HOLES BY HANDLING COMMON WEB SERVER CONFIGURATIONS

(75) Inventors: Priyank S. Garg, San Jose, CA (US); Amit Kumar, San Jose, CA (US); Apostolos Karmirantzos, Sunnyvale, CA (US); Di Chang, Milpitas, CA (US); Vivien Tong, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 612 days.

(21) Appl. No.: 11/491,309

(22) Filed: Jul. 21, 2006

(65) Prior Publication Data
US 2008/0021904 A1  Jan. 24, 2008

(51) Int. Cl.
G06F 7/00     (2006.01)
G06F 17/00    (2006.01)
G06F 21/00    (2006.01)
G06Q 40/00    (2006.01)
(52) U.S. Cl. .................. 707/690; 713/182; 705/42
(58) Field of Classification Search .............. 707/9
See application file for complete search history.

(56) References Cited

U.S. PATENT DOCUMENTS

| 6,957,229 | B1* | 10/2005 | Dyor ........................... 1/1 |
| 2001/0011275 | A1* | 8/2001 | Lin et al. ..................... 707/9 |
| 2002/0116525 | A1* | 8/2002 | Peters et al. ................ 709/242 |
| 2004/0168066 | A1* | 8/2004 | Alden ........................ 713/182 |
| 2005/0021494 | A1* | 1/2005 | Wilkinson ................... 707/1 |
| 2005/0097046 | A1* | 5/2005 | Singfield .................... 705/42 |
| 2006/0041554 | A1* | 2/2006 | Svendsen et al. ........... 707/9 |
| 2006/0053112 | A1* | 3/2006 | Chitkara et al. ............ 707/9 |
| 2006/0074913 | A1* | 4/2006 | O'Sullivan et al. ......... 707/9 |
| 2006/0117010 | A1* | 6/2006 | Hakala ....................... 707/9 |
| 2006/0136419 | A1* | 6/2006 | Brydon et al. .............. 707/9 |
| 2006/0149739 | A1* | 7/2006 | Myers ........................ 707/9 |

OTHER PUBLICATIONS

Jared Karro; Protecting Web Servers from Secuity Holes, in Server-Side Includes; 1998; pp. 1-9.*
http://googlewebmastercentral.blogspot.com/2009/10/changes-to-website-verification-in.html.*

* cited by examiner

Primary Examiner — Neveen Abel-Jalil
Assistant Examiner — Jermaine Mincey
(74) Attorney, Agent, or Firm — Hickman Palermo Truong & Becker LLP; Christian A. Nicholes; Daniel D. Ledesma

(57) ABSTRACT

Techniques are provided through which a user is verified as authorized to modify a website. A web crawler generates a filename and content for the user, who purports to be authorized to modify a particular website. The web crawler sends the filename and content toward the user. The user stores a file with the filename on a server that hosts the website. The user places the content within the file. The web crawler determines whether the file is stored on the server and whether the content is in the file. If so, then the web crawler stores information that indicates that the user is authorized to receive information pertaining to the website, which may be confidential information. If the file is not stored on the server or if the file does not contain the content, then the web crawler does not provide any information to the user pertaining to the website.

22 Claims, 3 Drawing Sheets

US 7,974,956 B2

AUTHENTICATING A SITE WHILE PROTECTING AGAINST SECURITY HOLES BY HANDLING COMMON WEB SERVER CONFIGURATIONS

FIELD OF THE INVENTION

The present invention relates to authenticating sites and, more specifically, to a technique for authenticating users that are authorized to modify a site while protecting against security holes by handling common web server configurations.

BACKGROUND

Current web crawlers analyze websites without any notion of a particular user owning the website. Therefore, the information gathered from crawling a website is limited to how a web crawler is configured to examine the website. For example, a web crawler may be configured to identify certain key words and/or phrases on websites. A web crawler may also be configured to analyze the structure of the text and graphics on websites in order to obtain a more accurate understanding of the content of the websites.

In addition to understanding a website, a web crawler would prefer to be able to authenticate a site as special, such as associating the site with an owner. In such a situation, the web crawler may provide the owner of a website with useful and private information about the website, such as where website traffic is coming from, what sites link to the website, "health" and errors of the website, etc. However, it is important that such private information is not shared with a competitor of the owner or some other imposter because the private information in possession of others may put the owner of the website at an unfair advantage. In this particular case, and in the more general case of authenticating the site as having special attributes, it is important to have a secure authentication mechanism to prevent malicious spoofing.

It is possible to verify that a user is the owner or an authorized representative of a website by adhering to the following procedure. As an example, a user might want confidential information pertaining to XYZ.com. First, the user may initiate a session, e.g. via a browser, with the entity that owns a particular web crawler. In the session, the user claims that the user owns or is at least authorized to modify XYZ.com. Second, the entity provides a filename to the user, such as "filename314159265". Third, the user creates a file on the website with the filename and then notifies the entity. Fourth, the website XYZ.com is searched (e.g. by the web crawler) and the web crawler determines whether a file with the filename of "filename314159265" exists on the website. The web crawler will know the file is not found if a 404 error message is sent to the web crawler. The 404 or Not Found error message is an HTTP standard response code indicating that a client (i.e. web crawler in this example) was able to communicate with a server hosting the website, but the server either could not find the file that was requested, or it was configured not to fulfill the request and not reveal the reason why. If a 404 error message is returned to the web crawler, then the web crawler does not trust the user and will not provide confidential information about XYZ.com to the user.

If the web crawler does not encounter a 404 error message, then that may be interpreted as an indication that the file with "filename314159265" as the filename is stored on the website. Consequently, the entity is confident that the user owns the website and/or is authorized to make modifications to the website. As a result, the entity may provide confidential information to the user about the website.

However, a problem exists when following the above approach. Many web servers are configured to not provide a 404 error message even if a file is not found on the website as long as the domain name in a URL is correct. Instead, such web servers return a 200 response code (which indicates that the request for the file has succeeded) with accompanying text that states that the requested page was not found. This web server response is known as a "soft 404". Because the web crawler received a 200 response code, the entity may mistakenly believe that the user is authorized to modify the website and consequently provide confidential information about the website to the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Figure 1:
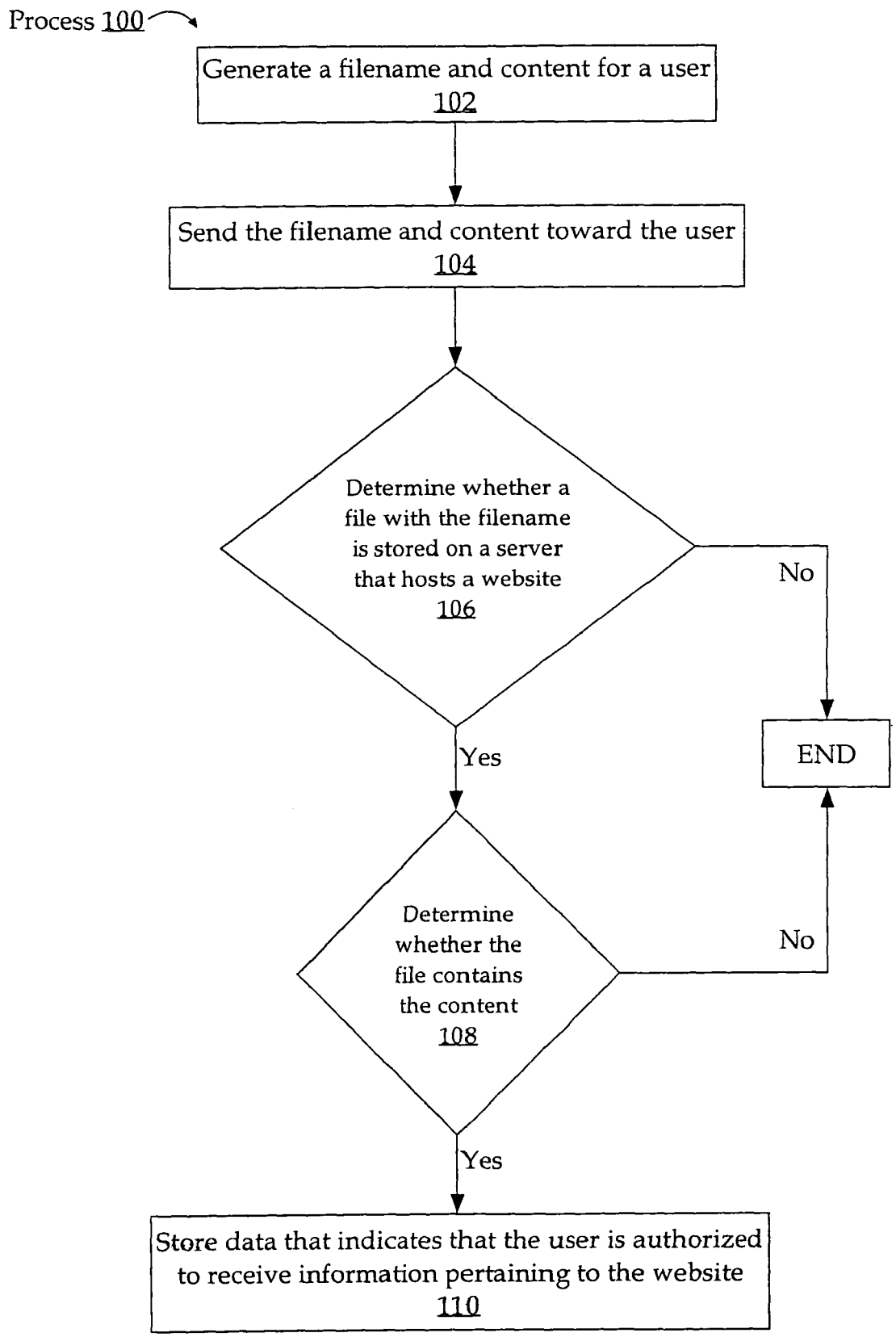
FIG. 1 is a flow diagram that illustrates how a web crawler may verify that a user is authorized to modify a website, according to an embodiment of the invention.

FIG. 1 is a flow diagram that illustrates a process 100 on how an entity may verify that a user is authorized to modify a website, according to an embodiment of the invention. At step 102, a filename and content is generated for a particular user. At step 104, the filename and content are sent toward the user. At step 106, it is determined whether the file is stored on a server that hosts a website, e.g. a website that the user purports to own or to be authorized to modify. If it is determined that the file is not stored on the server, then process 100 ends with respect to that user. If it is determined that the file is stored on the server, then it is determined whether the file contains the content (step 108). If not, then process 100 ends with respect to that user. However, if the file does contain the content, then data is stored (step 110). The data indicates that the user is authorized to receive information pertaining to the website. The information may be confidential information. Subsequently, the web crawler may provide to the user confidential information pertaining to the website. The user may also provide information to the web crawler to assist the web crawler in understanding the website.

Associating an Authorized User with a Website

In order to associate an authorized user with a website, it may be important to handle web servers that are configured to return soft 404 error messages when a file on a website is not found. If a soft 404 error message is returned, the entity that owns a particular web crawler may mistakenly trust a user who is not authorized to modify a website and subsequently provide confidential information thereto.

Figure 2:
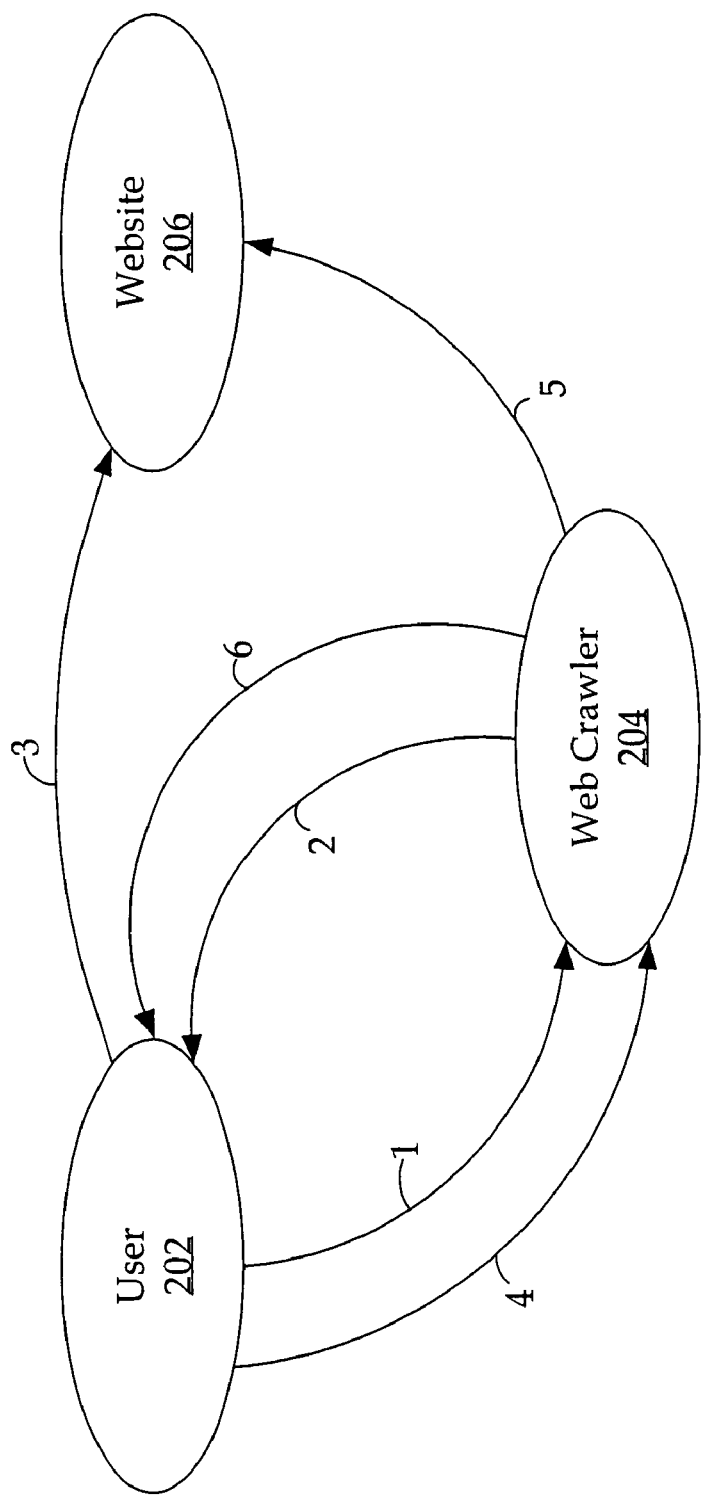
FIG. 2 is a block diagram that illustrates how an authorized user is associated with a website, according to an embodiment of the invention.

FIG. 2 is a block diagram that illustrates how an authorized user may be associated with a website while accounting for soft 404 web server configurations, according to an embodiment of the invention. Initially, at step 1, a session is generated, e.g. using a web browser, between a user 202 and a web crawler 204. (For the sake of description, reference to web crawler 204 includes the entity that owns the web crawler and the web crawler itself.) User 202 may log in by providing user information, such as name, contact information, password, etc. As user 202 is logged in, user 202 purports to own or to be authorized to modify a website 206 by indicating the name of website 206 to web crawler 204.

At step 2, web crawler 204 generates a filename and content and sends the filename and content toward user 202. In addition to the filename and content sent to user 202, step 2 may include communicating instructions for user 202 to create a file with the filename on the server that hosts website 206 and to place/store the content in the file.

Embodiments of the invention are not limited to how the filename and content are generated. For example, the filename and content may be generated using a random number generator and/or a random character generator. As another example, the filename and content may be generated instead by using a hash function where the name of user 202 and the name of website 206 are inputs to the hash function and the output is a unique value that is based on the inputs.

Typically, the content is a string, but the content may be in any format (e.g. binary text or image).

Returning to FIG. 2, user 202 creates a file with the filename and stores the file on the server that hosts website 206 (step 3). User 202 also places, in the file, the content received from web crawler 204. At step 4, user 202 may notify web crawler 204 that the file and content are on the server that hosts website 206. At step 5, web crawler 204 checks website 206 to determine whether the file is stored on the server and whether the contents are in the file. In one embodiment, the file must contain only the content. In another embodiment, the file may contain information in addition to the content. By searching for particular content in the file, web crawler 204 is ensured to not be deceived if a soft 404 error message is returned, which masks the non-existence of a file.

If the file is stored on the server and the contents are in the file, then web crawler 204 stores data that indicates that user 202 is authorized to receive confidential information pertaining to website 206. In this case, web crawler 404 associates user 202 with website 206. Then, at step 6, web crawler 204 sends the confidential information to user 202. User 202 may also provide site information to web crawler 204 to assist web crawler 204 in improving its "understanding" of website 206.

If the file is not stored on the server that hosts website 206, or if the file does not contain the contents, then information that indicates that user 202 is authorized to receive confidential information pertaining to website 206 is not stored. In this case, an association between user 202 and website 206 is not made. Therefore, web crawler 204 does not send the confidential information to user 202.

Hardware Overview

Figure 3:
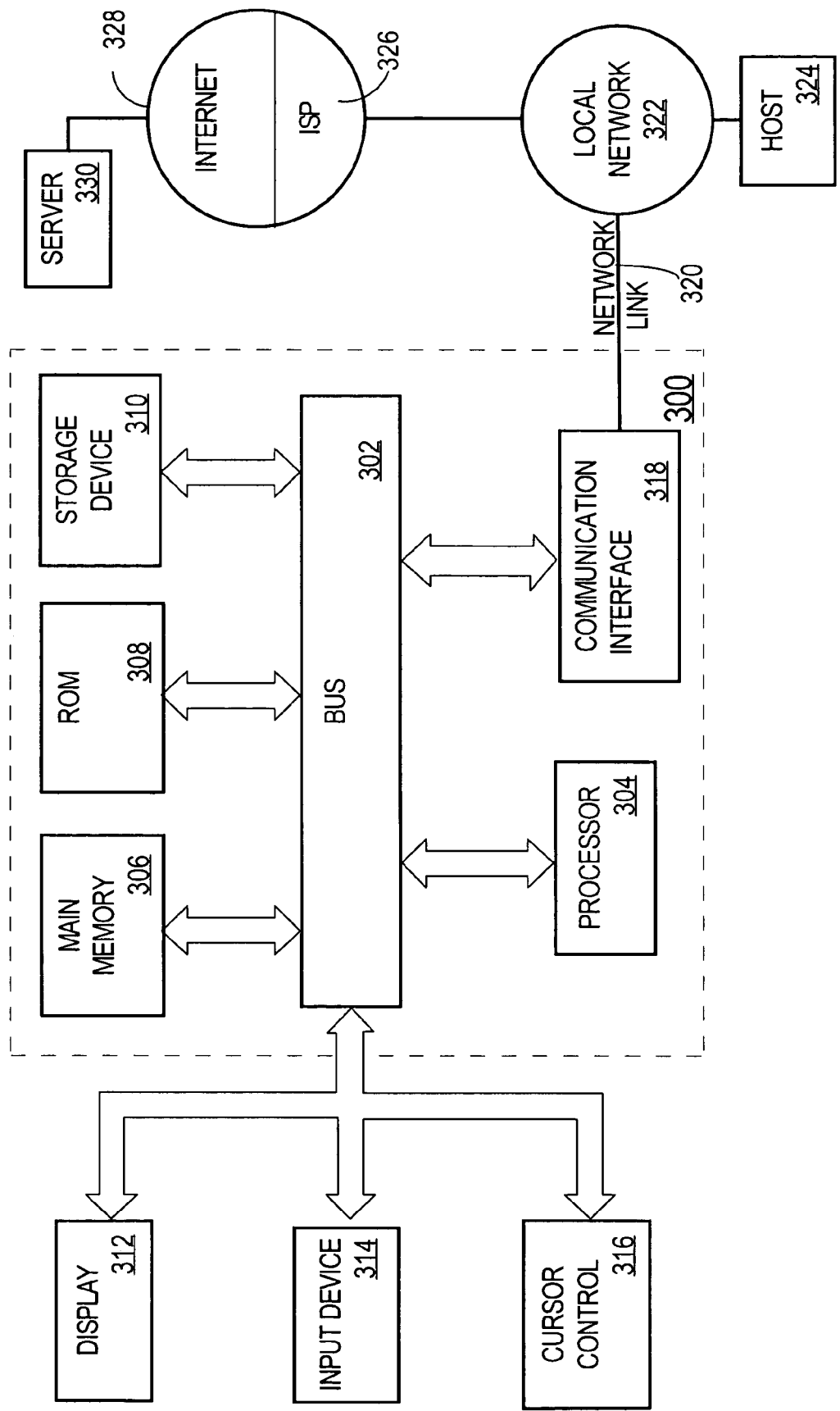
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for authenticating a user that requests information pertaining to a website, the method comprising the steps of:
    an entity associated with a web crawler generating a filename and content for the user that is purportedly authorized to modify the website;
    the entity sending the filename and the content toward the user without sending said information pertaining to the website toward the user, wherein a file with the filename and the content are not stored on a server that hosts the website when the filename and the content are sent toward the user;
    wherein, after the filename and content are sent toward the user, the user creates a file with the filename, causes the file to be stored on a server that hosts the website, and causes the content to be stored in the file;
    after sending the filename and content toward the user:
        determining whether a file with the filename is stored on a server that hosts the website;
        determining whether the file contains the content; and
        in response to determining that the file is stored on the server and the file contains the content, the entity storing data that indicates that the user is authorized to receive said information pertaining to the website;
        wherein said information pertaining to the website is sent toward the user only after it is determined that the file is stored on the server and the file contains the content;
    wherein the steps of generating, sending, and storing are performed on one or more computing devices.

2. The method of claim 1, wherein the information was generated by an entity that sent the filename and the content toward the user.

3. The method of claim 1, wherein the steps further comprise before generating the filename and content for the user, receiving login information from the user, wherein the user indicates that the user is purportedly authorized to modify the website.

4. The method of claim 1, wherein the steps further comprise before determining whether the file with the filename is stored on the server that hosts the website, receiving notification data from the user indicating that the file and content are on the website.

5. The method of claim 1, wherein the steps further comprise in response to determining a) that the file with the filename is stored on the server that hosts the website, and b) that the file contains the content, associating the user with the website.

6. The method of claim 1, wherein the step of storing data that indicates that the user is authorized to receive information pertaining to the website includes providing said information to the user.

7. The method of claim 1, wherein the server is configured to return a soft 404 error message when an entity that generated the filename and content attempts to determine whether a particular file is stored on the server and the particular file is not stored on the server.

8. The method of claim 1, wherein sending the filename and content toward a user includes instructing the user to store the file with the filename on the server and to store the content in the file.

9. A machine-readable storage medium storing instructions which, when executed by one or more processors, cause performance of the steps of claim 8.

10. A method for authenticating a user that requests information pertaining to a website, the method comprising the steps of:
    receiving login information from the user, wherein the user indicates that the user is purportedly authorized to modify the website;
    in response to receiving the login information, generating a filename and content for the user and sending the filename and the content toward the user without sending said information pertaining to the website toward the user, wherein a file with the filename and the content are not stored on a server that hosts the website when the filename and the content are sent toward the user;
    wherein, after the filename and content are sent toward the user, the user creates a file with the filename, causes the file to be stored on a server that hosts the website, and causes the content to be stored in the file;
    after sending the filename and content toward the user, receiving notification data from the user indicating that a file with the filename and the content are stored on a server that hosts the website;
    in response to receiving the notification data:
        determining whether a file with the filename is stored on the server that hosts the website; and
        determining whether the file contains the content; and
        only after determining that the file is stored on the server and that the file contains the content,
            associating the user with the website, and
            storing data that indicates that the user is authorized to receive said information pertaining to the website;
    wherein said information pertaining to the website is sent toward the user only after it is determined that the file is stored on the server and the file contains the content;

wherein the steps of receiving login information, generating, sending, and storing are performed on one or more computing devices.

11. The method of claim 1, wherein the information pertaining to the website includes at least one of an identification of one or more origins of web traffic to the website or an identification of one or more other websites that link to the website.

12. A machine-readable storage medium storing instructions which, when executed by one or more processors, cause performance of the steps of claim 1.

13. A machine-readable storage medium storing instructions which, when executed by one or more processors, cause performance of the steps of claim 3.

14. A machine-readable storage medium storing instructions which, when executed by one or more processors, cause performance of the steps of claim 3.

15. A machine-readable storage medium storing instructions which, when executed by one or more processors, cause performance of the steps of claim 4.

16. A machine-readable storage medium storing instructions which, when executed by one or more processors, cause performance of the steps of claim 5.

17. A machine-readable storage medium storing instructions which, when executed by one or more processors, cause performance of the steps of claim 6.

18. A machine-readable storage medium storing instructions which, when executed by one or more processors, cause performance of the steps of claim 7.

19. A machine-readable storage medium storing instructions which, when executed by one or more processors, cause performance of the steps of claim 10.

20. A machine-readable storage medium storing instructions which, when executed by one or more processors, cause performance of the steps of claim 11.

21. The method of claim 1, wherein said information pertaining to said website includes at least one of the following: references to where web traffic to said website originates, references to a plurality of websites that contain a link to said website, or one or more errors of said website.

22. A machine-readable storage medium storing instructions which, when executed by one more processors, cause performance of the steps of claim 21.

* * * * *

UNITED STATES PATENT AND TRADEMARK OFFICE
CERTIFICATE OF CORRECTION

| | | |
|---|---|---|
| PATENT NO. | : 7,974,956 B2 | Page 1 of 1 |
| APPLICATION NO. | : 11/491309 | |
| DATED | : July 5, 2011 | |
| INVENTOR(S) | : Priyank S. Garg et al. | |

It is certified that error appears in the above-identified patent and that said Letters Patent is hereby corrected as shown below:

COLUMN 8
Claim 13: Line 14: Delete "claim 3" and insert --claim 2--.

Signed and Sealed this
Ninth Day of August, 2011

David J. Kappos
*Director of the United States Patent and Trademark Office*